(12) United States Patent
Sentagnes et al.

(10) Patent No.: US 6,656,436 B1
(45) Date of Patent: Dec. 2, 2003

(54) DEVICE FOR TRANSFORMING CHEMICAL STRUCTURES IN A FLUID COMPRISING A SOLVENT AND SALTS BY ULTRASONIC ACTION

(75) Inventors: Dominique Sentagnes, 46, rue de Soissous, F-33000 Bordeaux (FR); Cyril Aymonier, Fert Ans (FR); Bernard Berdeu, Villenave d'Ornon (FR); François Cansell, Pessac (FR)

(73) Assignees: L'Electrolyse, Latresne (FR); Dominique Sentagnes, Bordeaux (FR)

( * ) Notice: Subject to any disclaimer, the term of this patent is extended or adjusted under 35 U.S.C. 154(b) by 0 days.

(21) Appl. No.: 09/720,258

(22) PCT Filed: Jul. 9, 1999

(86) PCT No.: PCT/FR99/01682
§ 371 (c)(1),
(2), (4) Date: Jan. 9, 2001

(87) PCT Pub. No.: WO00/02821
PCT Pub. Date: Jan. 20, 2000

(30) Foreign Application Priority Data

Jul. 10, 1998 (FR) .............................................. 98 08924

(51) Int. Cl.⁷ .............................. B01J 19/08; C02F 1/02
(52) U.S. Cl. ...................................... 422/186; 210/177
(58) Field of Search .......................... 422/186; 210/177; 204/157, 194

(56) References Cited

U.S. PATENT DOCUMENTS

| | | | |
|---|---|---|---|
| 4,793,919 A | * | 12/1988 | McCorquodale ............ 210/177 |
| 4,822,497 A | | 4/1989 | Hong et al. |
| 5,013,366 A | | 5/1991 | Jackson et al. |
| 5,118,447 A | | 6/1992 | Cox et al. |

FOREIGN PATENT DOCUMENTS

| EP | 0 157 339 | 10/1985 |
|---|---|---|
| WO | WO 81/00855 | 4/1981 |

* cited by examiner

*Primary Examiner*—James J. Seidleck
*Assistant Examiner*—Thao Tran
(74) *Attorney, Agent, or Firm*—Oblon, Spivak, McClelland, Maier & Neustadt, P.C.

(57) ABSTRACT

The present invention relates to a system for the conversion of chemical structures where the system contains a reservoir reactor having a first lower zone where high solubility of at least one salt in a solvent is maintained under first conditions of pressure and temperature, a second upper zone for precipitating at least one salt under second conditions of pressure and temperature, means for maintaining the first and second conditions of temperature and pressure, means for generating ultrasound, and means for forming a solvent in the lower part of the reservoir reactor.

16 Claims, 2 Drawing Sheets

DEVICE FOR TRANSFORMING CHEMICAL STRUCTURES IN A FLUID COMPRISING A SOLVENT AND SALTS BY ULTRASONIC ACTION

The present invention concerns a system for converting chemical structures, that is to say a system to produce chemical reactions in a fluid under pressure and at temperature, in particular a supercritical fluid, in which said fluid contains a solvent and at least one salt and is subjected to ultrasound action.

The area of the invention, may, in general, be defined as the area of chemical conversions, produced in a fluid medium under pressure and at temperature, in particular in a supercritical medium. Supercritical fluids in particular offer the advantage of providing better control over the conversion process, since a single phase system is used contrary to most conventional processes which use polyphase systems.

Most of the processes carried out in a fluid medium under pressure and at temperature, in particular in a supercritical medium, have the disadvantage, in order to properly conduct the conversions and reactions, of requiring the addition to the supercritical medium of various reagents, additives and active species, most of the time brought from outside the chamber in which the reaction takes place in a medium under pressure and at temperature, in particular in a supercritical medium. The addition of tease compounds often requires voluminous costly devices which, in addition, do not allow homogeneous distribution of the reagents and other products within the reactor under pressure and at temperature, supercritical in particular, and therefore do not provide optimal control over the reactions. This is the case in particular in processes in which oxidation of substances is carried out in an aqueous medium in which the air, required for the reaction, is collected at atmospheric pressure, is then compressed and finally injected into the medium. The compression of air requires large-scale installations and accounts for a major part of the high expense of the process. Also, the oxygen added is in molecular form and it is known that the latter is distinctly less active than oxygen in atomic form.

Numerous other oxidizing treatments in a fluid medium under pressure and temperature and in particular in a supercritical medium—chiefly in water—have been researched and developed. In this respect document WO-A-81/00855 may be cited which concerns the treatment of organic materials in supercritical water. The products obtained during this treatment are essentially carbon monoxide and dioxide. This document provides for the use of hydrogen capturing metals (Ni, Mo, Co, Pd, Pt) and their oxides as catalysts for the treatment. These catalysts, once again must be added from outside the supercritical reactor with the resulting disadvantages.

Treatments, other than treatments which use oxidation in a supercritical ,medium, are known, for example from document EP-A-0 157 339, which describes a process with which it is possible to prepare hydrocarbons, preferably saturated, from the sludge derived from treatment plants having a water content of 80 to 98.5% by treating this sludge at a temperature of 300 to 600° C. and at a pressure of 10 to 50 MPa (100 to 500 bars). The sludge, immediately after this treatment at high temperature and pressure, or simultaneously with this treatment, undergoes hydrogenation with the addition of molecular hydrogen, necessarily in the presence of a catalyst. Here again the same problems arise as those mentioned above concerning the addition of outside additives to the medium, and the low reactivity of hydrogen, as previously for molecular oxygen, requiring the necessary presence of an additional catalyst.

Document U.S. Pat. No. 5,118,447 concerns a process for the denitrification of nitrogen-containing compounds, in particular of nitrates and nitrites present in numerous industrial aqueous wastes derived for example from the chemical industry, from surface treatment industries, from explosives and ammunition industries.

In this process, it is again necessary to add formates to the medium to act as reducers of the nitrates and nitrites, before entering the supercritical domain.

In order to overcome the above-mentioned problems, that is to say to overcome the need for voluminous costly devices for reagents and additives, and in order to obtain a homogeneous, uniform reaction throughout the whole volume of the reactor, and to generate more efficient active species, without a catalyst, processes have been researched and developed in which the additive, the reagent, or the essential active species are generated in situ by electrochemical means in a supercritical medium.

Hence, document U.S. Pat. No. 4,581,105 relates to an electrochemical cell containing an aqueous electrolyte in the supercritical state. The electrolyte contains at least one species called an "electroactive species" which, when a current is applied to the electrodes, reacts to give "electrochemical products" that are soluble in the supercritical fluid.

In the anode and cathode compartments, oxygen and hydrogen may for example be generated.

Document EP-A-0 535 320 concerns a process and an oxidation device for inorganic and organic substances, in particular for aqueous waste, in which the waste is treated in a supercritical reactor containing an electrolysis zone to generate oxygen.

The process and devices, which generate active species by electrolysis in a supercritical medium, must be used on waste which already has sufficient conductivity, therefore with a high salt content, or in which considerable quantities of salts are added to give them suitably high conductivity. The same problems occur as with the processes and devices described above concerning the addition of additives. Moreover, the presence of salts in high concentration causes major precipitation and corrosion problems in supercritical reactors and in the entire installation.

In addition, electrolysis requires complex devices and finally generates reactive species whose reactivity is still not sufficient in a great number of cases.

The use of ultrasonics to produce reactions in fluids under pressure and at temperature has also been put forward in the literature.

Document U.S. Pat. No. 4,793,919, for example, concerns a process and equipment for the oxidation of aqueous suspensions of organic matter at high temperature and pressure in the presence of an oxidizing gas. The equipment comprises a reactor equipped with a static mixer in which the aqueous suspension to be treated circulates, and the oxidizing gas is added to the suspension. According to one particular embodiment of the equipment, ultrasound may be used to increase the oxidation reaction by breaking down the organic matter already partially oxidized and by causing the air bubbles to burst.

For this purpose, an ultrasound probe may be provided in the upper part of the reactor. Ultrasound may also be used in a configuration with several reactors in which, at the outlet of the static mixer, organic molecules which are broken down undergo further oxidation in a reactor located downstream. The type of reactors used is not specified.

This document specifically concerns an oxidation treatment which again involves the addition, from outside, of an additional reagent, namely an oxidizing gas. The same problems are faced therefore as those already mentioned above.

Document EP-A-0 832 852 describes a destruction process, by oxidation, of harmful substances in household waste waters, waters from industrial processes and drinking waters by means of persulphate at a temperature greater than 130° C. and under a pressure of more than 1 bar, for example 5 to 6 bars.

The reagents used and their proportions are detailed in claims 2 to 8 of this document, the oxidizing agent used may also contain hydrogen peroxide.

A base detergent, such as milk of lime, may be added to the treated water to maintain the pH, and it is also possible to use a catalyst.

It is also indicated in this document that ultrasonics may be used, but no range of frequency is mentioned.

This process and this device necessarily require the addition to the reactor of at least one reagent, in particular an oxidizing reagent, which means that the same problems as those described above continue to be raised.

Document U.S. Pat. No. 5,013,366 concerns a process to remove one or more pollutants from a substrate, in which the latter is placed in contact with a dense gas at a pressure equal to critical pressure or higher.

The process is then guided between the liquid and supercritical states by causing the temperature of the dense fluid to vary in a series of steps using temperatures above and below the critical temperature of the dense fluid.

In one embodiment of this process, the action of the dense fluid, during its changeover from the liquid state to the supercritical state, may be increased by using ultrasound energy.

A sonochemical reactor is also described in this document and comprises a container under pressure 62 equipped with a transducer.

Document DE-A-14 416 785 describes a device and a process for the extraction, in particular, of non polar or scarcely polar organic compounds from solid matter.

The process of this document brings an improvement to the extraction processes using supercritical gases, by combining the action of the latter with the use of ultrasonics.

The action of ultrasound on dense gases in the supercritical state, such as ethane, ethylene, propane, propene, trifluoromethane, $N_2O$, $SF_6$ and $CO_2$, allows for complete, quick extraction and saturation of the compounds to be extracted by means of the induced shaking.

The extraction of scarcely soluble compounds is therefore made possible.

The fluid is then released from pressure and is separated into two phases, and the gas recovered.

In this document, no chemical conversion of substances is made but a simple extraction of these substances from a substrate.

A need therefore exists for a system to convert chemical structures in a supercritical medium which, among others, can be used to generate active species in situ without the addition from outside of reagents and additives, and which generates very high reactivity, in particular greater than that obtained by electrolysis.

A need also exists for a device to convert chemical structures in a medium under pressure and at temperature, in particular a supercritical medium, which is easy can be used to treat any type of fluid irrespective of its conductivity and salt content.

The purpose of the present invention is therefore to provide a system which, among others, meets all the above-indicated needs, which does not have the disadvantages, limitations and defects and drawbacks of the methods of the prior art, and which solves the problems raised by the processes of the prior art.

This purpose and others besides are reached, according to the invention, with a system to conduct the conversion of at least one chemical structure in a fluid under pressure and at temperature containing a solvent and at least one salt, in which said system comprises a vertical reactor, called a "reservoir reactor", comprising a first lower zone in which the fluid is maintained under the first conditions of temperature and pressure ensuring high solubility of the salt or salts, and a second upper zone in which said fluid is maintained under second conditions of temperature and pressure leading to a precipitation of the salt or salts, said reservoir reactor being equipped with means to maintain said fluid in said first lower zone under said first conditions of temperature and pressure, with means to maintain said fluid in said second upper zone under said second conditions of temperature and pressure, means to generate ultrasound, and means to form said fluid in the lower part of said reservoir reactor.

Preferably, the system according to the invention, also comprises:

a second reactor, called a "tubular reactor" equipped with means to maintain the fluid under third conditions of temperature and pressure enabling a desired stage of advancement of the desired conversion to be obtained, and preferably connected with the upper part of said reservoir reactor.

Preferably, said first conditions of temperature and pressure are subcritical conditions, said second conditions of temperature and pressure are supercritical conditions, said third conditions of temperature and pressure are also supercritical conditions, optionally different from the second conditions of temperature and/or of pressure.

Preferably, from the foregoing and owing to the fact that the pressure must, preferably, be maintained constant throughout the entire system, said conditions of temperature and pressure only differ in temperature, the pressure being maintained constant throughout the entire system, and preferably being a pressure greater than critical point pressure Pc. On this account, the pressure being constant, the temperature in the upper zone is a temperature allowing precipitation of the salt or salts, the temperature in the lower zone is a temperature ensuring high solubility of the salts, and the third temperature in the tubular reactor is a temperature that is optionally different from said first and second temperatures, but however generally greater than the second temperature (generally Tc).

Advantageously, the waste treated by said system is saline aqueous waste and therefore said high solubility of the salt or salts may be defined as being from 1 to 10 g/l, while said precipitation corresponds to a solubility generally lower than 100 ppm.

In this system, the salts precipitate to the bottom of the reservoir reactor and are removed by suitable means. These mans may, for example, consist of means to inject a flow or stream of pure solvent, such as salt-free water, into the lower part of the reactor and of means to remove the flow of salt-containing solvent. The removal of the salts precipitated to the bottom of the reactor by rinsing or washing with a flow of solvent, such as pure water, may preferably be conducted continuously or in cycles. The removal of salts is greatly helped by the use of ultrasound.

It is to be noted that, according to the invention, the generation of ultrasound in the reactor prevents the adhesion of salts to the walls of the reactor and promotes their settling.

In particularly advantageous manner, means for submitting the fluid to electrolysis are provided in the lower zone of the reservoir reactor.

By fluid under pressure and at temperature is generally meant a fluid whose temperature and pressure under said first, second and third conditions of temperature and pressure are greater than its normal pressures and temperatures, namely 25° C. and 0.1 MPa (1 bar). Generally, the conditions of temperature and pressure of the fluid, in the system of the invention, whether the first, second or third conditions of temperature and pressure, range from 50 to 600° C. and from 0.5 to 60 MPa (5 to 600 bars). The temperature and pressure operating conditions in which the fluid is present may be defined in relation to the conversion(s) or reaction(s) to be produced. It is to be noted in the remainder of the description that the supercritical conditions, defined in relation to the pressures and temperatures at the critical point: Pc and Tc are defined relative to the whole of the fluid. The latter may be formed of a group of reagents, additives and active species, and on this account if the fluid is made up of a complex mixture, the critical coordinates of the fluid may be ill known. However, as a first approximation, for such a fluid, it can be considered that the Pc and Tc values of the fluid are very close to the Pc and Tc values of the solvent present in majority in the fluid or in the binary, ternary mixture, etc. that is chiefly present in the fluid, and in this case reference is made to the critical coordinates of the said solvent to define the supercritical domain.

According to the invention, generally three operating domains can be defined for the fluid under pressure and at temperature:

a supercritical domain in which the pressure and the temperature are, respectively, greater than Pc and Tc;

a subcritical domain in which the dense liquid phase is not in equilibrium with a gas phase, that is to say all the gases are dissolved in the liquid phase;

a diphase subcritical domain in which a liquid phase and a gas phase co-exist in equilibrium.

Therefore, for the remainder of the description, the fluid "under pressure and at temperature" is generally in one of the three domains defined above.

By way of example, for the case when the fluid is an aqueous fluid, water has a critical point defined by Tc=374° C. and Pc=22.1 MPa, therefore under supercritical conditions the pressure of the process will be greater than Pc and the temperature greater than 374° C.

The system of the invention brings a solution to all the problems mentioned above and meets all the needs indicated above.

It is recalled first of all that ultrasounds are elastic waves whose frequency lies between approximately 15 kilohertz and several hundred Megahertz, below this range it is spoken in terms of audible sounds or infrasounds, and above this range in terms of hypersounds. In the range of ultrasound frequencies, power ultrasonic waves are defined between 20 kHz and 100 kHz, and high frequency ultrasonic waves between 1 MHz and 10 MHz. It is known that the production of ultrasonic waves generally results from the conversion of an alternating electric field into a mechanical vibration by means of a convector. Submitting the fluid to the action of ultrasound therefore generally consists of transmitting this mechanical vibration to the fluid via a probe in the form of an acoustic wave. Under the action of the applied acoustic field, the molecules of the liquid vibrate from their principal position and an acoustic pressure super imposes itself over the hydrostatic pressure of the medium. The expression of the pressure in the medium is as follows:

$$P_T = P_H + P_A \cdot \sin(2\pi f t)$$

$P_T$, $P_H$ and $P_T$ are respectively the pressure in the medium at time t, the hydrostatic pressure of the medium and the amplitude of the acoustic wave, f is the frequency and t represents time.

When a negative pressure is applied to the medium ($P_A \cdot \sin(2\pi f t) << 0$), the distance between the molecules may exceed the critical molecular distance (distance beyond which the liquid "breaks"); vacuums or cavities grow until maximum negative pressure is reached. Then, during the compression cycle ($P_A \cdot \sin(2\pi f t) >> 0$), the bubbles implode and release considerable energy into the medium. The formation and the activity of the bubbles represent the phenomenon of cavitation.

In the system of the invention, by using ultrasound it is possible to generate active species in situ. On this account, the system of the invention does not have any of the disadvantages related to the addition of outside reagents for the chemical conversion of the species already present in the fluid under pressure and at temperature, supercritical in particular. The active species are generated at relatively low temperature. The active species generated are, moreover, very reactive active species, in particular compared with the reagents conventionally added—such as molecular oxygen in the case of oxidation—, or even compared with the active species generated by electrolysis. The species generated under the action of the ultrasound are generally radical species whose reactivity is extremely high compared with ionic and molecular species.

In general with the use of ultrasound it is possible to obtain a higher yield than when the same chemistry is used without ultrasound.

The interaction of the ultrasonic waves with matter, that is to say in this case, with the solvent and the chemical structure or structures, is indirect. It is known that these ultrasonic waves generate the phenomenon of cavitation, which is a source of energy.

Therefore if solvent is water, the action of ultrasound on water, known under the name sonolysis, also occurs in a medium under pressure and at temperature, supercritical in particular, and essentially according to the following equation (1):

$$H_2O \rightarrow N^\circ + OH^\circ \qquad (1)$$

In addition to the in situ generation of active species, generally by decomposition of the solvent, ultrasound contributes, in general, to a global increase in the reactivity of the medium, that is to say of the fluid, in particular of the supercritical fluid, which contains the chemical species to be converted. For example, the ultrasonic waves induce activation of the reactions by homolytic cleavage of the bonds of the chemical structures to be treated, which makes it possible to operate at relatively lower temperature without the addition of a catalyst.

The system of the invention, in addition, is extremely simple and reliable, since it only requires conventional means (probes) to generate ultrasound and a reservoir reactor under high pressure and high temperature, also of simple design. The system of the invention may be applied to any fluid under pressure and at temperature, supercritical in particular, of any kind, irrespective of its salt content, as unlike electrolysis no condition of fluid conductivity is required; it is therefore not necessary for the salts to be present in strong concentration in the fluid or for them to be added in excess for the process to be implemented. Corrosion-related problems of equipment are reduced.

In particular, the system of the invention concerns any fluid existing in one of the three domains of pressure and temperature defined above, or necessarily existing in two or more of these domains.

The action of the ultrasonic waves is produced in homogeneous manner in the whole of the fluid under pressure and at temperature, the supercritical fluid in particular, that is to say that the reactive species are distributed in homogenous, uniform manner in the entire chamber of the reactor containing the fluid under pressure and at temperature, the supercritical fluid in particular, and on this account the reaction involving these species or all the activations caused by ultrasound take place uniformly throughout the entire reactor and the yield of the reactions and conversions is thereby increased.

This homogeneous, uniform action of the ultrasonic waves throughout the entire fluid amounts to an additional advantage of the system of the invention, compared for example with the systems which use electrolysis or activation of the medium, and in which the generation of active species is only produced between the electrodes and in their vicinity.

All the ultrasonic energy dispersed in the fluid is available to activate the fluid and generate essentially radical species.

According to the invention, ultrasonic waves having a frequency of 20 kHz to 1 MHz are generally used and, preferably, power ultrasonic waves, that is to say whose frequency is from 20 kHz to 100 kHz, and it is also necessary to be placed beyond the threshold of cavitation defined as the frequency on and after which the phenomenon of cavitation is observed.

The value of the cavitation threshold is related in particular to the solvent, the viscosity of the medium, to temperature, pressure and to the shape of reactor, but may easily be determined by those skilled in the art.

Finally, in addition to the advantages and effects cited above, the system of the invention offers all the effects and advantages related to the fact that the chemical reaction is produced in a fluid under pressure and at temperature, and in particular in a supercritical fluid.

It is known that the first commercial application of ultrasonics dates back to 1917 and that the efficiency of ultrasonic activation in chemistry was demonstrated in 1927. Today the use of ultrasonics in chemistry is known under the name "sonochemistry".

Thus, ultrasonics are used in the areas of dissolution, homogenisation, emulsification and extraction. They have also been used for applications related to cleaning, disinfection or sterilization.

The use of ultrasound in media under pressure and at temperature, in particular in supercritical media under the specific conditions applied in the system of the invention, has not, however, up until now ever been mentioned or suggested.

By chemical structure is generally meant, according to the invention, any chemical structure that is to say any association of atoms or molecules whether solid liquid or gaseous.

This chemical structure may be of organic type, such as for example hydrocarbons, alcohols, organochlorine compounds, or of inorganic type or mineral type such as for example oxides, metal hydroxides, in particular it may be a salt.

This salt is chosen for example from among the salts of metal and metalloid cations with an anion chosen from among the chlorides, nitrates, acetates, sulphates, bromides, fluorides, carbonates, bicarbonates etc. These salts are for example salts found in waste from various industrial processes such as nitrates or sulphates.

According to the invention, and by means of ultrasound, it is not necessary for the fluid submitted to their action to contain a strong concentration of salts, unlike the processes which use electrolysis.

In the system of the invention the salt or salts contained in the fluid and/or the salts formed during the treatment are easily broken down by the ultrasonic waves, which prevents their accumulation and induced corrosion.

In other words, the use of ultrasound makes it possible to promote the precipitation of salts, avoids large aggregates and prevents the salts form sticking to the walls thereby facilitating the removal of salts in continuous or discontinuous manner.

The conversion produced in the system of the invention may only concern one of these chemical structures or several of these structures. These chemical structures may be of different type, that is to say for example that the conversion, reaction according to the invention may simultaneously concern one or more organic compounds and/or one or more mineral compounds such as a salt or salts.

Moreover, the chemical structure(s) affected by the conversion may also be a chemical structure or chemical structures forming part of the solvent.

By chemical conversion or reaction is generally meant in the process of the invention any modification affecting said chemical structure.

It may for example involve degradation of the molecular or atomic edifice of the said chemical structure(s) into one or more chemical structure(s) having a simpler molecular or atomic edifice. It may also involve the interaction of different chemical structures between themselves. These conversions may be any one or more of known reactions in organic or mineral chemistry such as cleavage, "lysis", condensation, addition, substitution, removal, reduction, oxidation, etc.

According to the invention, the fluid contains a solvent, this solvent forms the major part of the fluid and the chemical structure(s) are generally in solution or in suspension in this solvent in cases when, evidently, the said chemical structure(s) is or are not the solvent itself.

This solvent is generally chosen from among liquid or gaseous compounds under normal conditions of temperature and pressure.

Therefore the solvent may generally be chosen form among water, known organic solvents, liquids under normal conditions of temperature and pressure, and their mixtures.

The solvent may therefore be chosen from among the liquid alkanes with 5 to 20 C, such as n-pentane, isopentane, hexane, heptane, octane; the liquid alkenes with 5 to 20 C; liquid alkynes with 4 to 20 C; alcohols such as methanol, ethanol; ketones, such as acetone, ethers; esters; liquid chlorine- or fluorine-containing hydrocarbons; solvents derived from petroleum cracking such as white spirit; the other organic solvents, and their mixtures.

The solvent may also be chosen from among the gaseous compounds under normal conditions of temperature and pressure and their mixtures, among which may be cited carbon dioxide, helium, nitrogen, nitrous oxide, sulphur hexafluoride, gaseous alkanes with 1 to 5 carbon atoms; methane, ethane, propane, n-butane, isobutane, neopentane, gaseous alkenes having 2 to 4 carbon atoms; acetylene, propyne and butyne-1, gaseous dienes, such as propadiene, gaseous chlorine- and/or fluorine-containing hydrocarbons, for example chlorofluorocarbides so-called "Freons ®" and also called CFCs or NCFCs, etc., and their mixtures.

Preferably, the system of the invention can be used to treat aqueous waste and the solvent is therefore water.

Said third conditions of high temperature and pressure so that the conversion can reach the desired advanced stage are, preferably, supercritical conditions of pressure and temperature.

Said desired stage of advancement may correspond either to a partial conversion, or to a full conversion.

Under the action of ultrasound, a certain number of reactive species will be generated in the fluid, of which the major part are derived from sonolysis or decomposition of the solvent.

Therefore, if the solvent—in preferred manner—is water, the interaction of ultrasound with the latter will propose the following reaction described by the equation (1):

$$H_2O \updownarrow H^\circ + OH^\circ \tag{1}$$

On the basis of this equation, a certain number of combinations are possible:

$$H^\circ + O_2 \updownarrow HO_2^\circ \tag{2}$$

$$HO_2^\circ + HO_2 \updownarrow H_2O_2 + O_2 \tag{3}$$

$$OH^\circ + OH \updownarrow H_2O_2 \tag{4}$$

$$H^\circ + H \updownarrow H_2 \tag{5}$$

Moreover, an activation of the reactions and chemical structures to be treated also occurs, without a catalyst, through homolytic fragmentation of the bonds C—C, C—OH, C—Cl, O—O, etc. These bonds are, for example, those of the chemical structures other than the solvent present in the fluid.

Therefore, in the case of aqueous waste in which the solvent is water, these chemical structures will be the organic and/or mineral compounds present in the waste, whose degradation is generally sought to be caused.

The system of the invention generally functions without the addition of any reagent. However, in certain cases, it may prove to be advantageous to add to the fluid at least one additional reagent, that is to say different to the chemical structure(s) defined above of the solvent and salt(s), this reagent possibly being chosen from among oxidising compounds such as molecular oxygen and hydrogen peroxide $H_2O_2$. The action of ultrasound in this case is advantageous in that it leads to activation of the reactive species and therefore a reduction in operating temperature, and a reduction in the quantity of oxidising agent to be added since it is no longer necessary to operate in overstoichiometry.

The additional reagent may also be chosen from among reducing compounds, such as molecular hydrogen, hydrazine, lithium borohydride and sodium borohydride; these reagents are very costly and scarcely stable and the action of ultrasound makes it possible to limit their quantity to the strict minimum with the same advantages as for the oxidising agents and to avoid the use of catalysts.

Moreover, it is possible, in addition to the action of the ultrasonic waves, to submit the fluid to another form of activation, electrolysis for example.

Preferably, according to the invention, the solvent is water, the chemical structure(s) is or are a structure or structures whose degradation is sought with a view to its (their) destruction or conversion into products able to be used in industry. These structures are essentially organic compounds, such as chlorine compounds, alcohols, hydrocarbons, in particular aromatics, . . . or mineral compounds, such as nitrates, etc.

The treated fluid is therefore defined as aqueous waste, containing organic and/or mineral compounds (these organic and/or mineral compounds forming the structures to be converted), which may be derived from the paper industry, the mechanical industry, for example it may be de-inking sludge from paper pulp or waste oils, etc.

According to the invention, such waste may be treated rather by oxidation, that is to say that reactive species are generated in situ, such as $OH^\circ$, $H_2O_2$, $O_2$ and activation of the reactions occurs through homolytic cleavage of the bonds, such as C—C, C—OH, C—Cl, O—O, etc; or rather by reduction with the formation of $H^\circ$ from $H_2$ and optionally the addition of additional reagents, hydrazine for example, all at low temperature with activation of the molecules to be treated with no catalyst; and with lysis of the bonds at low temperature whereas this lysis is conventionally performed at high temperature. The involved reactions are, for example, as follows:

$$C-OH \updownarrow C^\circ + OH^\circ \tag{6}$$

$$C-Cl \updownarrow C^\circ + C^\circ \tag{7}$$

$$H_2 \updownarrow H^\circ + H^\circ \tag{8}$$

$$C^\circ + H^\circ \updownarrow C-H \tag{9}$$

$$H^\circ + OH^\circ \updownarrow H_2O \tag{10}$$

The means for forming said fluid generally comprise means for adding the solvent, the said chemical structure or structures, the said salt or salts, and optionally the additional reagent(s). If the solvent, before it is added to the chamber, already contains the said chemical structure(s) and/or the said salt(s), the said means simply comprise means for insertion of a single fluid stream into said chamber. Said insertion means generally comprise a pump or other appliance generally a high pressure pump, which is also used to maintain the reactor or chamber at suitable pressure greater than the pressure at critical point Pc.

The system of the invention also comprises means to bring the said fluid under the desired respective conditions of pressure and temperature, supercritical conditions in particular; evidently, these means must also be able to maintain said conditions of pressure and temperature, supercritical conditions in particular, for a sufficient time period to complete the desired conversions and reactions.

These means for bringing and maintaining the fluid under the desired respective conditions of temperature and pressure, supercritical conditions for example, may for example comprise firstly means to ensure a pressure in the first reactor or in each of its zones, and optionally in the second reactor, and secondly, means to maintain a temperature in the first reactor or chamber or in each of its zones, and optionally in the second reactor.

These means may, for example comprise a high pressure pump intended to pressurize the stream(s) of fluid before it (they) are added to the reservoir reactor, and a heat exchanger intended to bring the stream(s) of fluid into the desired temperature domain in the reservoir reactor or chamber.

The heat exchanger may be provided, for example, downstream from said high pressure pump.

Said means for generating ultrasound in said fluid generally comprise a generator, a converter and at least one ultrasonic probe.

The production of ultrasound generally results from the conversion of an alternating electric field into a mechanical vibration via a converter. This mechanical vibration is transmitted to the fluid via at least one probe in the form of an acoustic wave.

If only one probe is used, it is generally positioned in the centre of the chamber within the treated fluid.

If several probes need to be used, their arrangement in the chamber or reactor is determined so as to optimize cavitation phenomena and the efficiency of the desired reaction or reactions.

Other characteristics and advantages of the invention will become clearer on reading the following description of embodiments of the invention given for the purposes of illustration and which are in no way restrictive, with reference to the appended drawings in which.

Figure 1:
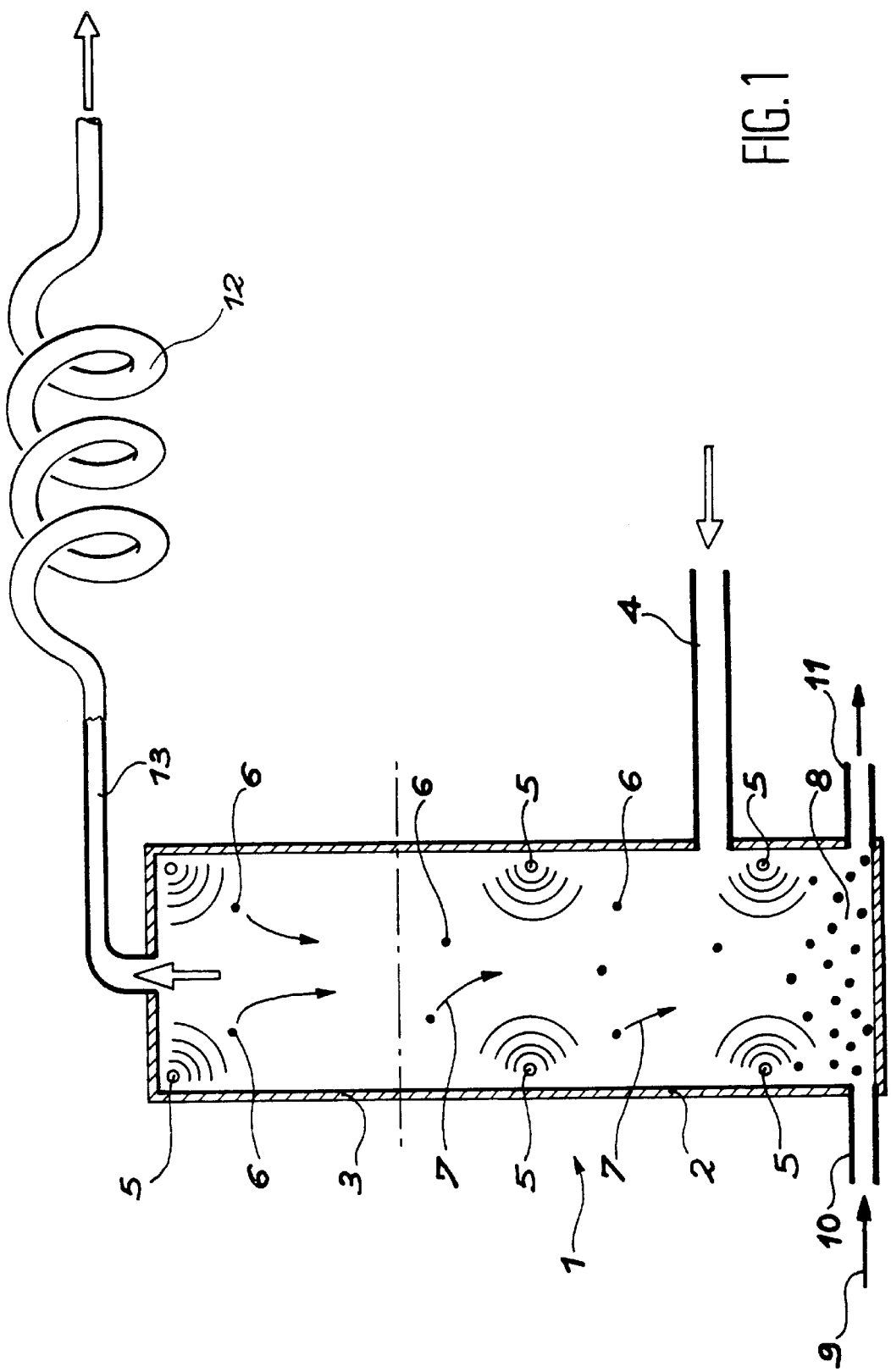
FIG. 1 is a cross section diagram of a system according to the invention designed in particular for the treatment of saline aqueous waste.

The system according to FIG. 1 comprises a reservoir reactor 1 whose entire chamber is brought to the same pressure.

The reservoir reactor comprises a first lower zone 2 at a first temperature enabling resolubilization of the salts and therefore enabling the salts to remain soluble in the fluid until saturation of said salts. For aqueous waste, the solubility in lower zone 2 is, for example, from 1 to 10 g/l. The reservoir reactor comprises a second upper zone 3 at a second temperature enabling precipitation which corresponds to very low solubility of the salts: namely, for example, less than 100 ppm.

The aqueous waste to be treated, containing for example chemical structures to be degraded and containing at least one salt, is added to the lower zone 2 of the reservoir reactor, for example via a pipe 4. The waste could previously have been brought to temperature and pressure by means of a pump, for example a high pressure pump (not shown).

In the reservoir reactor it is submitted to the action of ultrasound generated, for example, by six probes 5 which, in addition to their sonolysis action (bond cleavage) prevent the adhesion of the salts to the walls of the reservoir.

The salts 6, which precipitate 7, after saturation and accumulate 8 in the bottom of the reservoir reactor, are continuously evacuated by a stream of pure water 9 injected via pipe 10 which carries them outside the reactor via wash pipe 11. FIG. 1 shows six ultrasound probes distributed within the reactor, but evidently the number of these probes may be different and they may be distributed differently, for example they may be placed solely in the lower part and/or upper part of the reservoir reactor.

The system according to FIG. 1 also comprises a tubular reactor 12 connected to the upper part of the reservoir reactor, by means of a pipe 13. The pressure in said tubular reactor is generally identical to that of the reservoir reactor, but its temperature, supercritical in particular, is preferably greater than that of the second zone of the reservoir reactor.

The purpose of this reactor is to drive the advancement of the conversion or reaction as far as a partial or full conversion, with a view, in particular, either to fully degrade the chemical structures initially present in the waste, or to obtain target "re-usable" products such as hydrocarbons.

Figure 2:
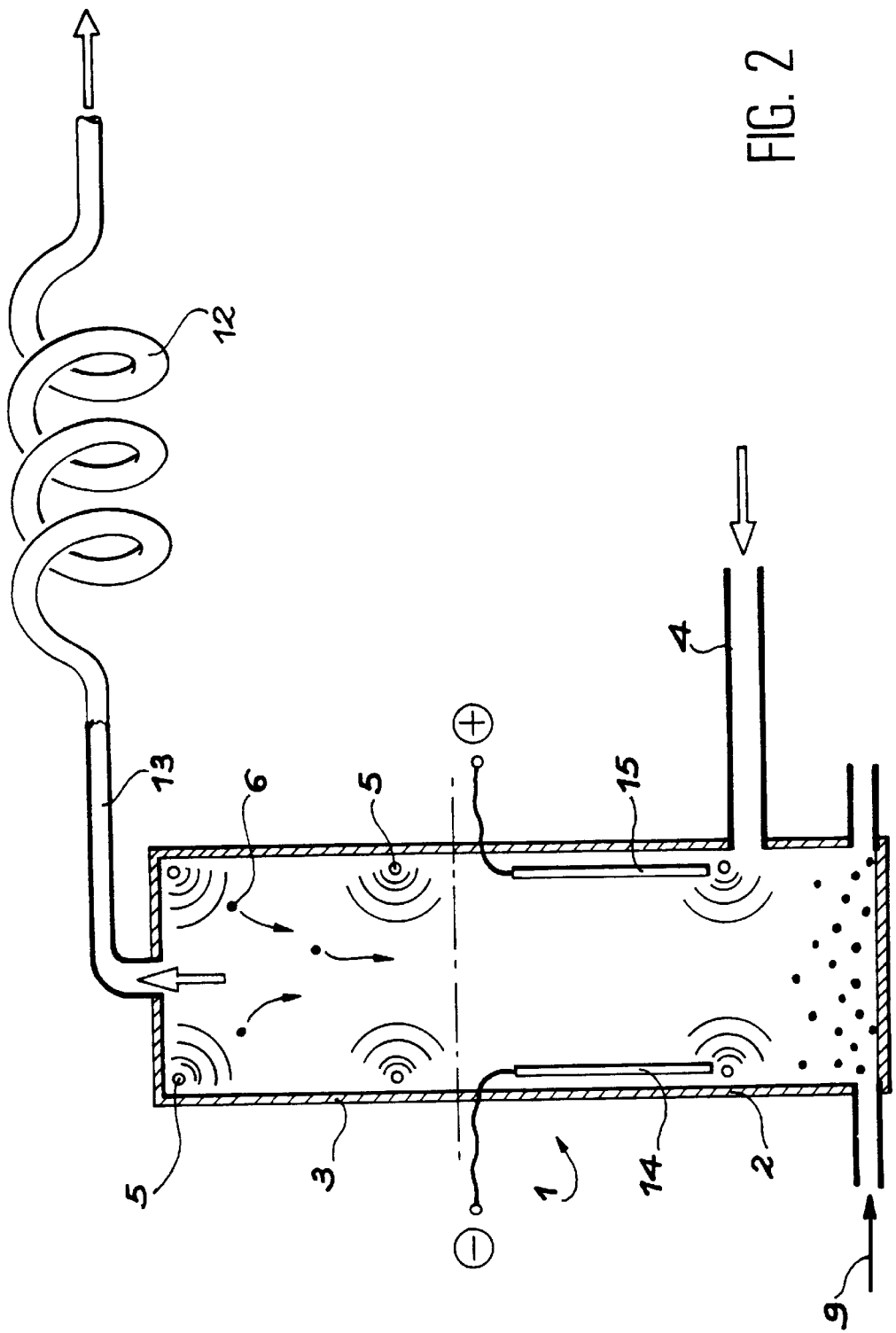
FIG. 2 is a cross section diagram of a system according to the invention designed in particular for the treatment of saline aqueous waste, which also comprises an electrolysis zone in the lower part.

FIG. 2, in which the references used are the same as those in FIG. 1, shows a system similar to the one in FIG. 1, in which provision has also been made for electrodes 14, 15 in the lower zone of the reservoir reactor in order to conduct electrolysis of the water in this lower zone and thereby to generate $O_2$ and $H_2$.

The electrolysis of the water generates oxidising and/or reducing species whose activity is increased by ultrasound.

What is claimed is:

1. A system for producing the conversion of at least one chemical structure present in a fluid under pressure and at temperature, wherein said fluid comprises a solvent and at least one salt, said system comprises a vertical reactor comprising a first lower zone in which the fluid is maintained under first conditions of temperature and pressure ensuring high solubility of the salt or salts, and a second upper zone in which said fluid is maintained under second conditions of temperature and pressure leading to a precipitation of the salt or salts;

wherein
said vertical reactor further comprises means for controlling a first temperature condition of said first lower zone, means for controlling a first pressure condition of said first lower zone, means for controlling a second temperature condition of said second upper zone, means for controlling a second pressure condition of said second upper zone, means for generating ultrasound, and means for forming said fluid in the lower part of said vertical reactor; and wherein
the first pressure condition being equal to or different than the second pressure condition, and
the first temperature condition being different than the second temperature condition.

2. The system according to claim 1, further comprising a second reactor comprising means for maintaining the fluid under third conditions of temperature and pressure with which it is possible to reach the desired stage of advancement of the conversion.

3. The system according to claim 2, in which the temperature and the pressure of the fluid under said first, second and third conditions of temperature and pressure are greater than normal pressures and temperatures.

4. The system according to claim 1, in which the pressure and temperature of the fluid are, respectively, from 0.5 to 60 MPa and from 50 to 600° C.

5. The system according to claim 1, in which said fluid under pressure and at temperature is in one of the following operating domains:
   a supercritical domain in which the pressure and temperature are, respectively, greater than the critical pressure and the critical temperature of the fluid;
   a subcritical domain in which the dense liquid phase is not in equilibrium with a gas phase, and in which all the gases are dissolved in the liquid phase;
   a diphase subcritical domain in which a liquid phase and a gas phase coexist in equilibrium.

6. The system according to claim 1, in which said ultrasounds are power ultrasounds whose frequency is from 20 kHz to 1 MHZ.

7. The system according to claim 1, in which said solvent is chosen from among the liquid and gaseous compounds under normal conditions of temperature and pressure.

8. The system according to claim 7, in which the solvent is at least one member selected from the group consisting of water, liquid alkanes with 5 to 20 carbon atoms, liquid alkenes with 5 to 20 carbon atoms, liquid alkynes with 4 to 20 carbon atoms, alcohols, ethers, esters, liquid chlorine-containing hydrocarbons, liquid fluorine-containing hydrocarbons, solvents derived from petroleum cracking, and other organic solvents.

9. The system according to claim 7, in which the solvent is at least one member selected from the group consisting of carbon dioxide, helium, nitrogen, nitrous oxide, sulphur hexafluoride, gaseous alkanes with 1 to 5 carbon atoms, gaseous alkanes with 2 to 4 carbon atoms, gaseous dienes, gaseous chlorine-containing hydrocarbons, and gaseous fluorine-containing hydrocarbons.

10. The system according to claim 1, in which at least one additional reagent is added to the fluid.

11. The system according to claim 10, in which said additional reagent is chosen from at least one oxidizing compound selected from the group consisting of molecular oxygen and hydrogen peroxide.

12. The system according to claim 10, in which said additional reagent is at least one reducing compound selected from the group consisting of molecular hydrogen, hydrazine, lithium borohydride and sodium borohydride.

13. The system according to claim 2, in which said first conditions of temperature and pressure are subcritical conditions, said second conditions of temperature and pressure are supercritical conditions and, optionally, said third conditions of temperature and pressure are supercritical conditions, optionally different from said second conditions of temperature and pressure.

14. The system according to claim 1, in which means for submitting the fluid to an electrolysis are provided in the lower zone of the vertical reactor.

15. The system according to claim 2, in which said desired stage of advancement corresponds to a full conversion.

16. The system according to claim 2, in which said desired stage of advancement corresponds to a partial conversion.

* * * * *